US012460038B2

(12) United States Patent
Cloutet et al.

(10) Patent No.: US 12,460,038 B2
(45) Date of Patent: Nov. 4, 2025

(54) POLYMERS AND THE USE THEREOF FOR DETECTING ION FLUXES

(71) Applicants: UNIVERSITE DE BORDEAUX, Bordeaux (FR); CENTRE NATIONAL DE LA RECHERCHE SCIENTIFIQUE, Paris (FR); INSTITUT POLYTECHNIQUE DE BORDEAUX, Talence (FR)

(72) Inventors: Eric Cloutet, Bègles (FR); Jochen Lang, Bordeaux (FR); Alexander Kuhn, Guillac (FR); Georges Hadziioannou, Léognan (FR); Matthieu Raoux, Gradignan (FR); Ariana Villarroel, Talence (FR); Myriam Abarkan, Mérignac (FR)

(73) Assignees: UNIVERSITE DE BORDEAUX, Bordeaux (FR); CENTRE NATIONAL DE LA RECHERCHE SCIENTIFIQUE, Paris (FR); INSTITUT POLYTECHNIQUE DE BORDEAUX, Talence (FR)

( * ) Notice: Subject to any disclaimer, the term of this patent is extended or adjusted under 35 U.S.C. 154(b) by 1176 days.

(21) Appl. No.: 17/415,252

(22) PCT Filed: Dec. 17, 2019

(86) PCT No.: PCT/FR2019/053121
§ 371 (c)(1),
(2) Date: Jun. 17, 2021

(87) PCT Pub. No.: WO2020/128303
PCT Pub. Date: Jun. 25, 2020

(65) Prior Publication Data
US 2022/0056189 A1 Feb. 24, 2022

(30) Foreign Application Priority Data
Dec. 17, 2018 (FR) ..................... 1873085

(51) Int. Cl.
*C09D 11/106* (2014.01)
*C07D 323/00* (2006.01)
*C07D 495/04* (2006.01)
*C08F 293/00* (2006.01)
*C09D 11/52* (2014.01)
*G01N 27/414* (2006.01)

(52) U.S. Cl.
CPC ........ *C08F 293/005* (2013.01); *C07D 323/00* (2013.01); *C07D 495/04* (2013.01); *C09D 11/106* (2013.01); *C09D 11/52* (2013.01); *G01N 27/414* (2013.01); *C08F 2438/03* (2013.01)

(58) Field of Classification Search
CPC . C08F 293/005; C07D 323/00; C07D 495/04; C09D 11/106; C09D 11/52
See application file for complete search history.

(56) References Cited

U.S. PATENT DOCUMENTS

| 8,182,949 B2 * | 5/2012 | Ohgi .................... C08F 8/12 |
| | | 429/491 |
| 2006/0165587 A1 | 7/2006 | Lee |
| 2011/0159517 A1 * | 6/2011 | Gee ................ G01N 33/6872 |
| | | 435/7.1 |
| 2013/0030271 A1 | 1/2013 | Lang et al. |

FOREIGN PATENT DOCUMENTS

| JP | 2017-032468 | 2/2017 |
| WO | 2004/090921 | 10/2004 |

OTHER PUBLICATIONS

Hamabe et al., "Properties of a bifunctional chelating resin containing aminomethylphosphonate and sulfonate derived from poly(x-bromobutylstyrene-co-divinylbenzene) beads," Reactive & Functional Polymers 69 (2009) 828-835 (Year: 2009).*
Heng et al., "One-Step Synthesis of K+-Selective Methacrylic-Acrylic Copolymers Containing Grafted Ionophore and Requiring No Plasticizer," Electroanalysis 2000, 12, No. 3 (Year: 2000).*
International Search Report for PCT/FR2019/053121 dated Mar. 27, 2020, 3 pages.
Written Opinion of the ISA for PCT/FR2019/053121 dated Mar. 27, 2020, 5 pages.
Y. Setsuko et al., "Development of ion sensors based on polysilsesquioxane modified chemically with crown ether derivatives in view of in vivo analyes", *Bunseki Kagaku* 2017, May 1, 2017, 66(6), pp. 431-436.
Tiejte-Girault et al., "Photopolymerisation of ion-selective membranes onto silicon nitride surfaces for ISFET fabrication", *Electrochimica Acta* 199, Jul. 6, 1990, 35(4), pp. 777-783.

* cited by examiner

*Primary Examiner* — Michael P Wieczorek
(74) *Attorney, Agent, or Firm* — NIXON & VANDERHYE

(57) ABSTRACT

Disclosed are ion-sensitive polymers and methods for their use for monitoring biological phenomena associated with ion fluxes, as well as organic electrochemical transistors including such polymers.

2 Claims, 8 Drawing Sheets

Oxidised           Reduced a)

b)

POLYMERS AND THE USE THEREOF FOR DETECTING ION FLUXES

BACKGROUND OF THE INVENTION

Field of the Invention

The present invention relates to ion-sensitive polymers and their use for the monitoring of biological phenomena associated to ion fluxes, as well as to organic electrochemical transistors comprising such polymers.

Description of the Related Art

Electrical activity is at the basis of many essential events in living systems, such as the activity of the brain, the heart's beats or the hormonal secretion. In particular, this electrical activity is conveyed by the transmembrane flux of ions of different types. These cellular signals are often recorded thanks to probes which require genetic or chemical modifications. Furthermore, techniques that are in use nowadays to measure ion currents at the cell level, in particular the "patch-clamp" technique, require a high level of expertise to be used and do not allow performing an ion current measurement for more than a few minutes. It would be advantageous, in particular in order to be able to apply technique on humans, to obtain specific unbiased signals of a given ion type, and to facilitate the use of the technique by recording intrinsic signals without using techniques that are not as sophisticated as the "patch-clamp" technique. Extracellular microelectrode arrays (MEA) have been developed, enabling a non-invasive analysis of electrical phenomena at the cell level over a long period, but, on the one hand, these systems are not specific to an ion type and, on the other hand, their signal-to-noise ratio is still low.

The detection of the specific ion fluxes, that is to say fluxes of a given type of ions, is essential to understand cell signs as well as their changes in the context of some pathologies, genetic, pharmacological or toxicological manipulations or during the maturation and/or differentiation of stem cells.

The detection of the specific ion fluxes can also enhance the specificity of biosensors using cells or micro-organs as sensors.

Furthermore, the development of organs-on-a-chip, miniaturised devices using the combination of microfluids and live cells to replicate the complexity of human organs and ultimately of the entire organism, is nowadays a major concern for the understanding of physiology and physiopathology, the development of new medicines or toxicity studies. In this context, it is important to be able to monitor the specific ion phenomena in a rigorous and non-invasive way.

The detection of specific ions also allows for a quick analysis of liquid samples derived from biological organisms, environmental liquid samples, and/or liquid samples collected during the monitoring of chemical processes.

The operation of organic electrochemical transistors (OECT), which are based on semiconductor polymers, is based on the movement of ions via non-invasive methods, allowing for an amplification of the signals without increasing the noise and can provide information on the cellular activity. However, they cannot differentiate, by themselves, the different types of ions that are involved in the membrane ion fluxes, which prevents the obtainment of a more accurate image of the activity of the considered cells or micro-organs.

To remedy that deficiency, ion-selective electrodes have been designed. These electrodes are in the form of membranes that are selective for a given ion type and associated to conductive polymers. However, a material that is both electronically transductive and ion-sensitive, and which would allow improving in particular specificity for a given ion type, and covering large surfaces by repetitive printing, does not exist.

SUMMARY OF THE INVENTION

In this context, the inventors have developed new polymers and polymer complexes that are both electronically conductive and specific to the target ions, as well as conductive inks comprising said polymers or complexes. The polymers are either electronically conductive as such, or they form a conductive complex in a mixture with an electronically conductive polymer. The obtained inks are particularly suitable for use in the manufacture of electrodes and transistors allowing recording signals at the cell level. The use of these polymers and inks in transistors allows combining together:

- the advantages of the polymers and inks, in particular the improvement in specificity for a type of ions, and the repetitive printing of micrometric units on large surfaces, and
- the advantages of the transistors, in particular the reduction of the detection threshold by amplification and noise reduction.

First of all, the present invention relates to the use of at least one polymer comprising at least one unit of formula (I)

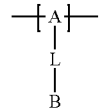

Formula (I)

wherein
A is a polymerisable monomer,
L is a spacer arm, and
B is a chemical group capable of complexing or chelating at least one ion selected from the group consisting of $K^+$, $Na^+$, $Ca^{2+}$ and $Zn^{2+}$,
in a method for coating an electrode or for manufacturing an organic electrochemical transistor.

It also relates to a conductive ink comprising at least one polymer comprising at least one unit of formula (I)

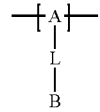

Formula (I)

wherein A is a polymerisable monomer, L is a spacer arm, and B is a chemical group capable of complexing or chelating at least one ion selected from the group consisting of $K^+$, $Na^+$, $Ca^{2+}$ and $Zn^{2+}$, wherein either the polymer comprising at least one unit of formula (I) is an electronically conductive polymer, or the polymer comprising at least one unit of formula (I) is electronically non-conductive and is in the form of a mixture with another electronically conductive polymer.

It also relates to an organic electrochemical transistor comprising as a semiconductor film a film comprising at least one polymer comprising at least one unit of formula (I)

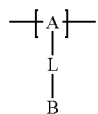

Formula (I)

wherein A is a polymerisable monomer, L is a spacer arm, and B is a chemical group capable of complexing or chelating at least one ion selected from the group consisting of $K^+$, $Na^+$, $Ca^{2+}$ and $Zn^{2+}$.

It also relates to the use of such a transistor for the detection of at least one flux of an ion selected from the group consisting of $K^+$, $Na^+$, $Ca^{2+}$ and $Zn^{2+}$ at the level of a cell or a set of cells.

It also relates to the use of such a transistor for the detection of the presence of at least one ion selected from the group consisting of $K^+$, $Na^+$, $Ca^{2+}$ and $Zn^{2+}$ in a liquid sample derived from a biological organism, in an environmental liquid sample, or in a liquid sample collected during the monitoring of a chemical process.

It also relates to a polymer comprising at least one unit of formula (I)

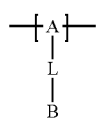

Formula (I)

wherein A is a polymerisable monomer, L is a spacer arm, and B is a chemical group capable of complexing or chelating at least one ion selected from the group consisting of $K^+$, $Na^+$, $Ca^{2+}$ and $Zn^{2+}$, and wherein A is preferably selected from the group consisting of styrene, sulfonated styrene, and 3,4-ethylenedioxythiophene.

Finally, it relates to a monomer of formula (II)

A-L-B      Formula (II)

wherein A is a polymerisable monomer, L is a spacer arm, and B is a chemical group capable of complexing or chelating at least one ion selected from the group consisting of $K^+$, $Na^+$, $Ca^{2+}$ and $Zn^{2+}$,
wherein the monomer of formula (II) is selected from the group consisting of:
4-vinylbenzyl(sulfonyl)-4'-(benzo-15-crown-5)-ylamine 1,
4-vinylbenzyl(sulfonyl)-4'-(benzo-18-crown-8)-ylamine 2,
4-vinylbenzyl-4'-(methyl-15-crown-5)-methylether 4,
4-vinylbenzyl-4'-(methyl-18-crown-8)-methylether 5,
(2,3-dihydrothieno[3,4-b][1,4]dioxin-2-yl)-4'-(benzo-15-crown-5)-methylamine 6,
(2,3-dihydrothieno[3,4-b][1,4]dioxin-2-yl)-4'-(benzo-18-crown-6)-methylamine 7,
(2,3-dihydrothieno[3,4-b][1,4]dioxin-2-yl)-N,N-bis((pyridin-2-yl)methyl) methanamine 8,
(2,3-dihydrothieno[3,4-b][1,4]dioxin-2-yl)-2-(methyl-15-crown-5)-methylether 9, and
(2,3-dihydrothieno[3,4-b][1,4]dioxin-2-yl)-2-(methyl-18-crown-6)-methylether 10.

Other particularities and advantages will appear upon reading the description hereinafter. The figures are presented only but for indicative purposes and do not limit the invention.

DESCRIPTION OF THE PREFERRED EMBODIMENTS

Figure 1:
FIG. 1 presents the synthesised inks: from the left-side to the right-side, PEDOT ink: PSTFSI_80-co-PS15-crown-5 (1)_20, PEDOT ink: PSTFSI_85-co-PS15-crown-5 (1)_15, PEDOT ink: PSTFSI_85-co-PS18-crown-6 (2)_15 and PEDOT ink: PSTFSI_85-co-PS18-crown-6 (2) (250 KDa)_15 (a); two PEDOT-based inks in their doped and undoped states (electrolyte 0.1M NaCl, V=−0.75 mV) (b et c): PEDOT: commercial PSS, transparent in its oxidised state (b left) and blue in its reduced state (b right); PEDOT: PSTFSI-85:PSP15Cr5SI-15, transparent in the oxidised state (c left) and blue in the reduced state (c right).
Figure 1:
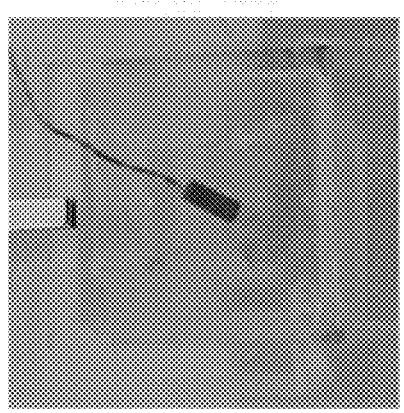
Figure 1:
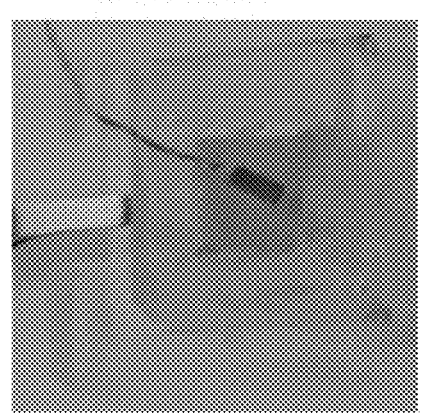
Figure 1:
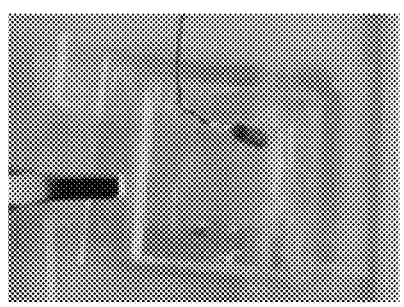
Figure 1:
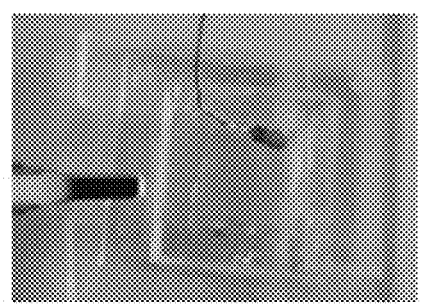

First of all, the present invention relates to the use of at least one polymer comprising at least one unit of formula (I)

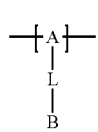

Formula (I)

wherein
A is a polymerisable monomer,
L is a spacer arm, and
B is a chemical group capable of complexing or chelating at least one ion selected from the group consisting of $K^+$, $Na^+$, $Ca^{2+}$ and $Zn^{2+}$,
in a method for coating an electrode or for manufacturing an organic electrochemical transistor.

Thus, the invention covers a method for coating an electrode or for manufacturing an organic electrochemical transistor comprising at least one step of using at least one polymer comprising at least one unit of formula (I)

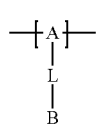

Formula (I)

wherein
A is a polymerisable monomer,
L is a spacer arm, and
B is a chemical group capable of complexing or chelating at least one ion selected from the group consisting of $K^+$, $Na^+$, $Ca^{2+}$ and $Zn^{2+}$.

These ions are important ions in electrophysiology. Indeed, the cations $K^+$, $Na^+$ and $Ca^{2+}$ are renown in particular for carrying electric current that cross the cell membrane. In particular, the cation $Zn^{2+}$ is important in the context of diabetes, to the extent that the pancreatic beta cells release molar amounts of $Zn^{2+}$ and of insulin in a determined ratio (2 $Zn^{2+}$ for 6 insulin molecules). Hence, monitoring of the released $Zn^{2+}$ enables a monitoring of the diabetes, in particular to adapt the prescribed treatment.

By "polymerisable monomer", it should be understood a monomer comprising at least one reactive function capable of forming a covalent bond with another monomer. The polymerisable monomers according to the invention can form electronically conductive polymers by homopolymerisation or by copolymerisation with at least one other monomer, preferably another monomer according the invention. For example, mention may be made of the 3,4-ethylenedioxythiophene (EDOT) monomer. Alternatively, the polymerisable monomer according to the invention can form a polymer that is not conductive by itself, by homopolymerisation or by copolymerisation with at least one other monomer, but form a conductive complex in the presence of another electronically conductive polymer. For example, mention may be made of styrene and sulfonated styrene monomers, in particular sodium sulfonated styrene, which can be used as stabilisers during the oxidative polymerisation of EDOT in water to form a conductive complex such as the PEDOT:PSS which is a mixture of poly(3,4-ethylenedioxythiophene) and of sodium poly(styrene sulfonate).

In one embodiment, the polymerisable monomer A is selected from the group consisting of styrene, sulfonated styrene, in particular sodium sulfonated styrene, 3,4-ethylenedioxythiophene, alkyl acrylates, alkyl methacrylates, thiophene and pyrrole.

In one embodiment, the polymerisable monomer A is selected from the group consisting of styrene, sulfonated styrene, in particular sodium sulfonated styrene and 3,4-ethylenedioxythiophene.

In one embodiment, the polymerisable monomer A is an oligomer, such as a dimer or a trimer, of a polymerisable monomer such as a styrene, sulfonated styrene or 3,4-ethylenedioxythiophene monomer.

By "spacer arm", it should be understood a series of covalently bonded atoms. Typically, the spacer arm is a group comprising at least one carbon, hydrogen, phosphorus, sulfur, nitrogen and/or oxygen atom. In one embodiment, the spacer arm is a group comprising at least one carbon, hydrogen, nitrogen and/or oxygen atom. For example, the sequence of atoms of the spacer arm linking the polymerisable monomer A and the chemical group capable of complexing or chelating an ion B comprises from 1 to 10 atoms, preferably from 1 to 5 atoms, in particular from 1 to 3 atoms. In particular, the spacer arm L may consist of an oxygen atom, a sulfur atom, an alkyl group, an ether group, a thioether group, an amine group such as a secondary or tertiary group, an alkylamine group, an amide group, an ester group, a cycloalkyl group, a heterocyclic group, a phosphate group or a ketone group. In one embodiment, the spacer arm is selected from the group consisting of an oxygen atom, an alkyl group, an ether group, an amine group such as a secondary or tertiary amine, an alkylamine group, an amide group, an ester group, a cycloalkyl group, a heterocyclic group or a ketone group. Preferably, the spacer arm is selected from the group consisting of an amine group, in particular NH, an alkyl group, in particular $CH_2$, an ether group, in particular $CH_2$—O—$CH_2$, and an alkylamine group, in particular $CH_2$—NH. In the case where the spacer arm is not symmetrical, it may be placed in either direction between the polymerisable monomer A and the chemical group capable of complexing or chelating an ion B. The spacer arm may also comprise several groups as listed hereinabove covalently bonded to one another. For example, the spacer arm may consist of an alkylamine group, an alkylester group, an alkylamide group, or an alkylketone group.

By "alkyl group", it should be understood a linear or branched saturated hydrocarbon group comprising from 1 to 4 carbon atoms. As examples of alkyl groups, mention may be made of methyl, ethyl, n-propyl, isopropyl, n-butyl, sec-butyl and iso-butyl groups, preferably methyl and ethyl groups.

By "ether group", it should be understood two alkyl groups covalently bonded to one another by an oxygen atom. For example, mention may be made of the $CH_2$—O—$CH_2$ group.

By "thioether group", it should be understood two alkyl groups covalently bonded to one another by a sulfur atom. For example, mention may be made of the $CH_2$—S—$CH_2$ group.

By "amine group", it should be understood a NH group or a N-alkyl group.

By "amide group", it should be understood a C(=O)—NH group.

By "ester group", it should be understood a C(=O)—O group.

By "cycloalkyl group", it should be understood a saturated, unsaturated or aromatic, preferably saturated, hydrocarbon cycle, comprising from 1 to 10 carbon atoms.

In particular, the cycloalkyl group may consist of a cyclopropane, a cyclobutane, a cyclopentane, a cyclohexane, a cycloheptane, a cyclooctane, a cyclobutene, a cyclopentene, a cyclohexene, or a phenyl.

By "heterocyclic group", it should be understood a saturated, unsaturated or aromatic hydrocarbon cycle, comprising from 1 to 10 members, and interrupted by at least one heteroatom selected from the group consisting of oxygen, nitrogen and sulfur atoms. Preferably, the heterocyclic group comprises 5 or 6 members. In particular, the heterocyclic group may consist of a furan, a tetrahydrofuran, a thiophene, a pyrrole, a pyridine, a pyran, an oxazine, a thiazine, a pyrimidine or a piperazine. The heterocyclic group may possibly comprise several cycles, for example, it may consist of a bicyclic group.

By "ketone group", it should be understood a C(=O) group.

By "chemical group capable of complexing or chelating at least one ion", it should be understood a chemical group whose structure allows for a non-covalent interaction with at least one ion. Preferably, the non-covalent interaction between the chemical group and the at least one ion is specific, that is to say the affinity of the chemical group for the target ion is at least 2 times, preferably at least 10 times, higher than that one for another ion of the list, preferably that one for any other ion of the list.

For example, B may be selected from crown ethers, cyclic ionophores such as valinomycin and nonactin, and the di(2-picolyl)amine (or Bis(2-pyridylmethyl)amine) group. Preferably, B is selected from crown ethers and the di(2-picolyl)amine group.

By "crown ethers", it should be understood the cyclic oligomers of ethylene oxide, possibly substituted, known for their capability of interacting with cations. As examples of crown ethers, mention may be made of the 12-crown-4 ether, the 15-crown-5 ether, 18-crown-6 ether and the 21-crown-7, possibly substituted, in particular substituted with at least one benzyl. Preferably, the crown ether is the 15-crown-5 ether or the 18-crown-6 ether, possibly substituted, in particular with a benzyl. The sulfur analogs of oxygenated crown ethers (crown thioethers) are also included within the term "crown ethers" according to the invention. In this respect, mention may be made in particular of 1,5,9,13-tetrathiacyclohexadecane. The nitrogen analogs of oxygenated crown ethers are also included within the term "crown ethers" according to the invention, as well as the crown aza ether mixed analogs. In this respect, mention may respectively be made of hexaazacyclooctadecane, 1,4,7,10-tetraazacyclododecane (nitrogen analogs) and diaza-18-crown-6 (mixed analog).

In one embodiment, the ion is the potassium ion $K^+$ and B is selected from the group consisting of the 18-crown-6 ether (1,4,7,10,13,16-hexaoxacyclooctadecane), possibly substituted, valinomycin and nonactin.

In one embodiment, the ion is the sodium ion $Na^+$ and B is the 15-crown-5 ether (1,4,7,10,13-pentaoxacyclopentadecane), possibly substituted.

In one embodiment, the ion is the zinc ion $Zn^{2+}$ and B is the di(2-picolyl)amine group, possibly substituted.

The polymer comprising at least one unit of formula (I) is either an electronically conductive polymer, or it is electronically non-conductive and is used in the form of a mixture with another electronically conductive polymer. In this second case, the polymer according to the invention advantageously acts as a stabiliser during the synthesis of an electronically conductive polymer with which it is mixed. The mixture with an electronically conductive polymer is also referred to as "conductive complex" in the present invention.

By "electronically conductive polymer", it should be understood a polymer that alternately includes simple and multiple bonds, capable of conducting electrons. It may consist of a conductive or semiconductor polymer, possibly doped to increase the conduction properties thereof.

The method for coating an electrode or for manufacturing an organic electrochemical transistor may consist of any process conventionally implemented in this field. The electrode may consist of an electrode for an organic-electrochemical transistor.

In one embodiment, the polymer comprising at least one unit of formula (I) is used in the form of an ink, that is to say it is comprised in a conductive ink.

The conductive ink, the conductive complex or the conductive polymer comprising at least one unit of formula (I) can be deposited on the electrode or on the substrate of the transistor by any technique known in the art, in particular by spin coating or by inkjet printing.

The invention also relates to a conductive ink comprising at least one polymer comprising at least one unit of formula (I)

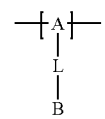

Formula (I)

wherein A, L and B are as defined hereinbefore, wherein either the polymer comprising at least one unit of formula (I) is an electronically conductive polymer, or the polymer comprising at least one unit of formula (I) is electronically non-conductive and is in the form of a mixture with another electronically conductive polymer.

A conductive ink according to the invention is a complex mixture of compounds comprising at least one polymer comprising at least one unit of formula (I) and at least one additive, for example a solvent or a formulation agent. In particular, the solvent may consist of water. A conductive ink according to the invention has physicochemical properties such that its wettability and/or its viscosity in particular which actually enable deposition or printing thereof. Printing of the conductive ink according to the invention produces an electronically conductive printed object. The conductive ink according to the invention may comprise additives that are commonly used in bioelectronics to obtain films with better properties. For example, the ink may contain at least one compound to improve its conductivity, for example a co-solvent like dimethylsulfoxyde (DMSO) or ethylene glycol (EG), at least one compound to enhance its surface adhesion, for example the cross-linking agent 3-glycidoxypropyl trimethoxysilane (GOPS) or the cross-linking agent divinyl sulfone (DVS), at least one compound to enhance the stability of the conductive ink film in an aqueous environment, for example the cross-linking agent 3-glycidoxypropyl trimethoxysilane (GOPS) or the cross-linking agent divinyl sulfone (DVS), and/or at least one compound to improve wetting on the substrate, for example a surfactant of the Zonyl® class (polytetrafluoroethylene resins) or the 4-dodecylbenzene sulfonic acid (DBSA).

For example, this ink may consist of a PEDOT-based ion-sensitive ink obtained by stabilizing an aqueous dispersion of EDOT monomers with at least one polymer comprising at least one unit of formula (I) as defined hereinbefore, in particular at least one copolymer of at least one of the monomers 4-vinylbenzyl(sulfonyl)-4'-(benzo-15-crown-5)-ylamine 1,4-vinylbenzyl(sulfonyl)-4'-(benzo-18-crown-8)-ylamine 2 and N-(4-vinylbenzyl) (pyridin-2-yl)-N-((pyridin-2-yl)methyl)methylamine 3, with styrene (trifluoromethanesulfonyl)imide (STFSI), and then by carrying out the oxidative polymerisation of said dispersion. This allows conferring ion sensitivity on a PEDO-based conductive ink.

In use, the inks according to the invention may be formulated, deposited in the form of films by different known techniques. The used technique may be adapted according to the viscosity of the ink and may consist of 'spin coating', 'doctor blade', 'slot die' or 'spray coating'. In addition, the inks may be characterised by different electrochemical methods, in particular by determining their ion sensitivity.

The invention also relates to an organic electrochemical transistor comprising, as a semiconductor film, a film comprising at least one polymer comprising at least one unit of formula (I)

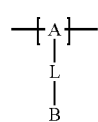

Formula (I)

wherein A, L and B are as defined hereinbefore. This transistor has the advantage of being directly ion-specific without requiring the combination of an ion-specific membrane and of a conductive polymer. Hence, the method for manufacturing the transistor is simplified since the conductive polymer or the conductive complex fills a dual function of ion selectivity and conduction. Advantageously, the transistors according to the invention can be used as ion-specific sensors for electrophysiological records in particular, for research applications and in the biomedical field.

Thanks to the ion specificity of the polymers used in the semiconductor films of the transistors according to the invention, these do not require any ion-specific membrane. Preferably, the transistor according to the invention comprises no membrane specific to at least one type of ions.

In one embodiment, the semiconductor film of the transistor according to the invention is obtained by printing or depositing a conductive ink according to the invention.

Either the polymer comprising at least one unit of formula (I) comprised in the film of the transistor according to the invention is an electronically conductive polymer, or it is electronically non-conductive and is in the form of a mixture with another electronically conductive polymer.

Another object of the invention is the use of a transistor according to the invention for the detection of at least one flux of an ion selected from the group consisting of $K^+$, $Na^+$, $Ca^{2+}$ and $Zn^{2+}$ at the level of a cell or of a set of cells. The cell or the set of cells may be either in vivo or in vitro, for example within a cell culture, preferably in vitro. In particular, the cell or the set of cells may lie over the transistor. The transistor may be used for the detection of specific ion fluxes during physiological, physiopathological (functional explorations and diagnosis), pharmacological, toxicological investigations or at the level of organs-on-a-chip. The transistor may also be used for the detection of specific ion fluxes during the maturation and/or differentiation of stem cells for example to monitor their differentiation and then improve the differentiation protocols or when using differentiated stem cells as a genetic disease model. The transistor may also be used according to the invention for the detection of specific ion fluxes at the level of a bio-sensor using cells, for example clonal cells, primary or stem cells, or microorganisms as sensors. In a particular embodiment, and for legal or ethical reasons, the stem cells shall be understood with the exception of human embryonic stem cells. Finally, the transistor may be used according to the invention for the detection of $Zn^{2+}$ which is co-secreted with insulin at the pancreatic beta cells, in particular for the monitoring and/or the quantification of the insulin secretion in a patient suffering from diabetes.

The transistor according to the invention may be part of a sensor used in a device that could be implanted at least partially in the body of a patient. Preferably, the transistor according to the invention is located inside the patient.

Another object of the invention is the use of a transistor according to the invention for the detection of the presence and/or the quantification of at least one ion selected from the group consisting of $K^+$, $Na^+$, $Ca^{2+}$ and $Zn^{2+}$ in a liquid sample derived from a biological organism, in an environmental liquid sample, or in a liquid sample collected during the monitoring of a chemical process.

For example, the liquid sample to be analysed may consist of a liquid sample comprising cells, an organ, a biological organism, an environmental liquid sample or a liquid sample collected during the monitoring of a chemical process.

To the extent that the conductive polymers, conductive complexes and conductive inks according to the invention could be deposited on flexible supports, the transistors according to the invention allow getting rid of the stiffness of the metallic electrodes which is a major concern when interfacing electrodes and biological material, in particular in vivo.

Furthermore, they allow detecting ion fluxes while getting rid of the problems inherent to optical methods such as photobleaching, heat-up or bias by the use of organic probes or derived from genetic modifications The organic electrochemical transistor according to the invention may be manufactured by any technique known in the art for manufacturing OECTs. For example, the conductive ink according to the invention may be deposited on a substrate made of glass or plastic such as polyethylene terephthalate (PET).

Although the description of the present application mainly relates to an organic electrochemical transistor comprising, as a semiconductor film, a film comprising at least one polymer according to the invention, in the case where the polymer according to the invention is used to coat an electrode, the properties and features described hereinbefore for the transistor can be directly transposed to the coated electrode.

The invention also relates to a polymer comprising at least one unit of formula (I)

Formula (I)

wherein A is a polymerisable monomer, L is a spacer arm, and B is a chemical group capable of complexing or chelating at least one ion selected from the group consisting of $K^+$, $Na^+$, $Ca^{2+}$ and $Zn^{2+}$, and wherein A is preferably selected from the group consisting of styrene, sulfonated styrene, in particular sodium sulfonated styrene, and 3,4-ethylenedioxythiophene. The polymer according to the invention may comprise only units of formula (I) (homopolymer), or a combination of such units with at least one other unit (copolymer). Advantageously, these other units may consist of EDOT units, STFSI units, styrene units, sulfonated styrene, in particular sodium sulfonated styrene, units or units of formula (I) with A, L and/or B different from those of the first unit.

In particular, the polymer according to the invention may be a copolymer between a 4-vinylbenzyl(sulfonyl)-4'-(benzo-15-crown-5)-ylamine 1,4-vinylbenzyl(sulfonyl)-4'-(benzo-18-crown-8)-ylamine 2 or N-(4-vinylbenzyl) (pyridin-2-yl)-N-((pyridin-2-yl)methyl)methylamine 3 monomer and the STFSI monomer. In this case, it consists of a non-conductive polymer but forming a conductive complex when it is in a mixture with PEDOT or a derivative or analog thereof. In this case, the polymer according to the invention acts as a stabiliser during the synthesis of PEDOT or of the derivative or analog thereof, in particular when the latter is polymerised in an oxidative way in an aqueous medium (dispersed).

In particular, the polymer according to the invention may be a copolymer between a 4-vinylbenzyl-4'-(methyl-15-crown-5)-methylether 4 or 4-vinylbenzyl-4'-(methyl-18-crown-8)-methylether 5 monomer and the STFSI monomer. In this case, it consists of a non-conductive polymer but forming a conductive complex when it is in a mixture with PEDOT or a derivative or analog thereof.

Alternatively, the polymer according to the invention may be a homopolymer of a monomer selected from the groups constituted by the monomers (2,3-dihydrothieno[3,4-b][1,4]dioxin-2-yl)-4'-(benzo-15-crown-5)-methylamine 6, (2,3-dihydrothieno[3,4-(2,3-dihydrothieno[3,4-b][1,4]dioxin-2-yl)-4'-(benzo-18-crown-6)-methylamine 7, b][1,4]dioxin-2-yl)-N,N-bis((pyridin-2-yl)methyl) methanamine 8, (2,3-dihydrothieno[3,4-b][1,4]dioxin-2-yl)-2-(methyl-15-crown-5)-methylether 9, and (2,3-dihydrothieno[3,4-b][1,4]dioxin-2-yl)-2-(methyl-18-crown-6)-methylether 10, in particular a homopolymer of the monomer 6. In this case, it consists of an electronically conductive polymer.

Alternatively, the polymer according to the invention may be a copolymer between a monomer selected from the group consisting of the monomers 6, 7, 8, 9 and 10 and an EDOT monomer, in particular a copolymer between the monomer 6 and an EDOT monomer. In this case, it consists of an electronically conductive polymer.

In the case of copolymers involving units that have not the formula (I), the weight ratios of the units of formula (I)/other units is advantageously comprised within the range 5/95 to 50/50.

The polymers according to the invention may have a variable chain length within a wide range, in particular within the range commonly implemented for the use of PEDOT or PEDOT:PSS as a conductive polymer or conductive complex respectively. When, in the formula (I), A is styrene or sulfonated styrene, in particular sodium sulfonated styrene, the polymer according to the invention typically has a molar mass comprised between 100 and 300 kg/mol.

The polymers according to the invention may be obtained by polymerisation of monomers of formula (II)

A-L-B          Formula (II)

Wherein A, L and B are as defined hereinbefore, or by copolymerisation of such monomers with other monomers. The polymerisation may be carried out by any technique known in the field to polymerise the monomers of formula A. For example, the electronically conductive polymers according to the invention which are such that A is EDOT and are derivatives or analogs of PEDOT can be obtained by radical oxidative polymerisation, or by electropolymerisation. The non-conductive polymers according to the invention which are such that A is sulfonated styrene and are derivatives or analogs of sulfonated polystyrene can be obtained by radical polymerisation, advantageously by radical polymerisation controlled via RAFT (radical polymerisation controlled by reversible addition-fragmentation chain-transfer) or NMP (nitroxide-mediated radical polymerisation).

In one embodiment, the unit of formula (I) comprised in the polymer according to the invention is selected from the group consisting of:
4-vinylbenzyl(sulfonyl)-4'-(benzo-15-crown-5)-ylamine 1,
4-vinylbenzyl(sulfonyl)-4'-(benzo-18-crown-8)-ylamine 2,
N-(4-vinylbenzyl) (pyridin-2-yl)-N-((pyridin-2-yl)methyl)methylamine 3,
4-vinylbenzyl-4'-(methyl-15-crown-5)-methylether 4,
4-vinylbenzyl-4'-(methyl-18-crown-8)-methylether 5,
(2,3-dihydrothieno[3,4-b][1,4]dioxin-2-yl)-4'-(benzo-15-crown-5)-methylamine 6,
(2,3-dihydrothieno[3,4-b][1,4]dioxin-2-yl)-4'-(benzo-18-crown-6)-methylamine 7,
(2,3-dihydrothieno[3,4-b][1,4]dioxin-2-yl)-N,N-bis((pyridin-2-yl)methyl) methanamine 8,
(2,3-dihydrothieno[3,4-b][1,4]dioxin-2-yl)-2-(methyl-15-crown-5)-methylether 9, and
(2,3-dihydrothieno[3,4-b][1,4]dioxin-2-yl)-2-(methyl-18-crown-6)-methylether 10.

Preferably, the unit of formula (I) is selected from the group consisting of:
4-vinylbenzyl(sulfonyl)-4'-(benzo-15-crown-5)-ylamine 1,
4-vinylbenzyl(sulfonyl)-4'-(benzo-18-crown-8)-ylamine 2, 4-vinylbenzyl-4'-(methyl-15-crown-5)-methylether 4,
4-vinylbenzyl-4'-(methyl-18-crown-8)-methylether 5,
  (2,3-dihydrothieno[3,4-b][1,4]dioxin-2-yl)-4'-(benzo-15-crown-5)-methylamine 6,
  (2,3-dihydrothieno[3,4-b][1,4]dioxin-2-yl)-4'-(benzo-18-crown-6)-methylamine 7,
    (2,3-dihydrothieno[3,4-b][1,4]dioxin-2-yl)-N,N-bis((pyridin-2-yl)methyl) methanamine 8,
(2,3-dihydrothieno[3,4-b][1,4]dioxin-2-yl)-2-(methyl-15-crown-5)-methylether 9, and
  (2,3-dihydrothieno[3,4-b][1,4]dioxin-2-yl)-2-(methyl-18-crown-6)-methylether 10.

The invention also relates to an electronically conductive complex comprising a polymer according to the invention, preferably a non-conductive polymer according to the invention, and an electronically conductive polymer. For example, the electronically conductive polymer in the electronic complex may consist of PEDOT or a derivative or analog thereof. In particular, a PEDOT derivative may be obtained by replacement of at least some EDOT monomers with EDOT monomers substituted, in particular at the level of at least one of the carbon atoms of the ethylenedioxy group of the EDOT monomer, with at least one chemical group. In particular, a PEDOT analog may be obtained by replacement of at least some EDOT monomers with monomers wherein the ethylenedioxy group is replaced with a propylenedioxy group, possibly substituted, or by replacement of one or several oxygen atom(s) of at least some EDOT monomers with nitrogen, selenium or sulfur atoms.

The electronically conductive polymers and/or complexes according to the invention combine ion conduction and sensitivity properties. By this combination, their use may advantageously be considered in conductive inks, in organic electrochemical transistors, or in any other system for detecting and/or quantifying said ions, for example in order to determine their concentration in analytes.

Finally, the invention relates to a monomer of formula (II),

A-L-B                     Formula (II)

wherein A is a polymerisable monomer, L is a spacer arm, and B is a chemical group capable of complexing or chelating at least one ion selected from the group consisting of $K^+$, $Na^+$, $Ca^{2+}$ and $Zn^{2+}$, Preferably, the monomer according to the invention is selected from the group consisting of:
  4-vinylbenzyl(sulfonyl)-4'-(benzo-15-crown-5)-ylamine 1,
  4-vinylbenzyl(sulfonyl)-4'-(benzo-18-crown-8)-ylamine 2,
  4-vinylbenzyl-4'-(methyl-15-crown-5)-methylether 4,
  4-vinylbenzyl-4'-(methyl-18-crown-8)-methylether 5,
    (2,3-dihydrothieno[3,4-b][1,4]dioxin-2-yl)-4'-(benzo-15-crown-5)-methylamine 6,
    (2,3-dihydrothieno[3,4-b][1,4]dioxin-2-yl)-4'-(benzo-18-crown-6)-methylamine 7,
      (2,3-dihydrothieno[3,4-b][1,4]dioxin-2-yl)-N,N-bis((pyridin-2-yl)methyl) methanamine 8,
(2,3-dihydrothieno[3,4-b][1,4]dioxin-2-yl)-2-(methyl-15-crown-5)-methylether 9, and
  (2,3-dihydrothieno[3,4-b][1,4]dioxin-2-yl)-2-(methyl-18-crown-6)-methylether 10.

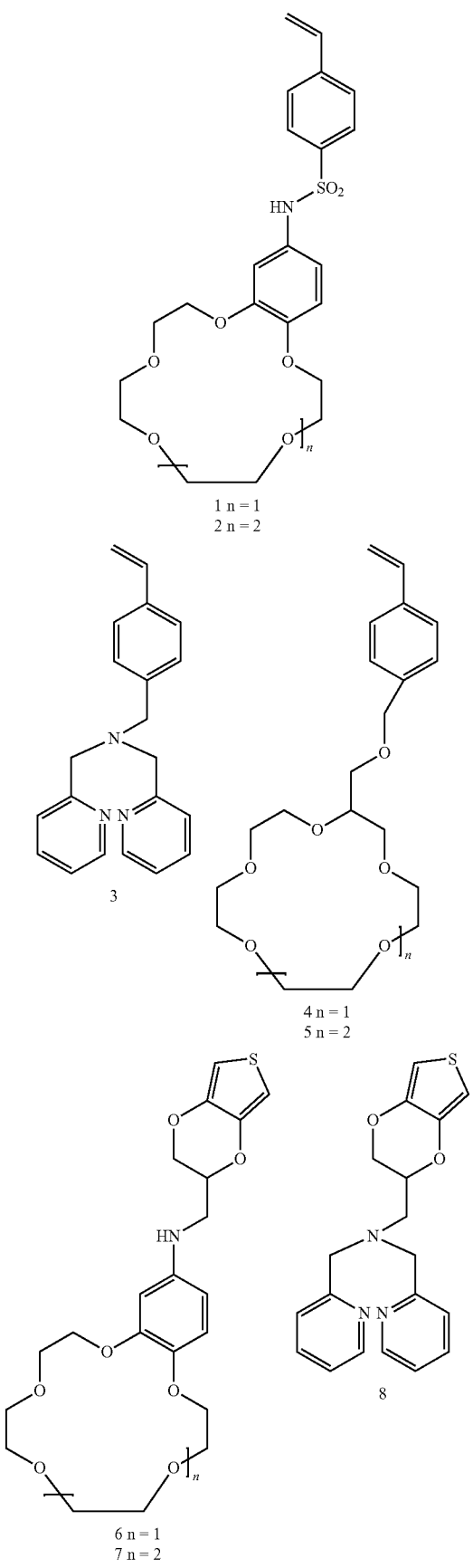

-continued

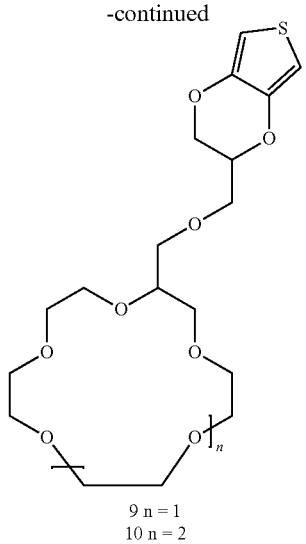

9 n = 1
10 n = 2

The examples hereinafter are intended to illustrate the invention without limiting the scope thereof.

EXAMPLES

Example 1: Synthesis of Monomers According to the Invention

Synthesis of the Monomers 1 and 2
Step 1—Formation of 4-Styrene Sulfonyl Chloride:

In a three-necked flask, flamed and dried beforehand, 60 mL of dried and degassed acetonitrile have been introduced. Then, oxalyl chloride (5.91 g; 46.6 mmol; 1.2 eq.) and dimethylformamide (DMF) have been added. This solution has been vigorously stirred at room temperature to solubilise the reactants and promote the formation of the Vilsmaier-Haack complex for 4-5 hours. Once the characteristics yellow colour is steadily obtained, sodium 4-styrene-sulfonate (8.0 g; 38.8 mmol; 1.0 eq.) has been added to the reactive medium under an inert atmosphere and at room temperature. After 24 hours of reaction, the precipitated salt has been separated by filtering and the reactive mixture has been used in the second step.

Step 2—Synthesis of 4-vinylbenzyl(sulfonyl)-4'-(benzo-15-crown-5)-ylamine (Sph15cr5SI):

In a three-necked flask, dried and flamed beforehand, anhydrous acetonitrile (V=50 mL), triethylamine (4.29 g; 30.2 mmol; 3 eq.) and 4'-aminobenzo-15-crown-5 (3.00 g; 10.1 mmol; 1 eq.) have been added. This mixture has been stirred for one hour. Meanwhile, the 4-styrene sulfonyl chloride solution (of step 1) has been cooled down to 0° C. Afterwards, the 4'-aminobenzo-15-crown-5 solution has been added under vacuum to the latter. After the addition, the reactive mixture has been stirred at room temperature for 16 hours. The solvent of the reactive medium has been evaporated under reduced pressure and the obtained residue has been solubilised in dichloromethane, and then successive extractions with potassium carbonate have been carried out followed by washing with a 1M solution of hydrochloric acid. Finally, the organic solvent has been evaporated and the obtained residue dried under vacuum for 16 h at 45° C. The product has been obtained in the form of a brown-coloured viscous solid (yield (Rdt)=54%).

$^1$H-NMR (400 MHZ; CDCl$_3$; 298K): ppm 7.73 (d, 2H); 7.57 (d, 2H); 6.79 (q, 1H); 6.71 (d, 1H); 6.29 (s, 1H); 6.21 (d, 1H); 5.95 (d, 1H); 5.38 (d, 1H); 3.85 (m, 4H); 3.74 (dt, 4H); 3.67-3.63 (m, 8H); $^{13}$C-NMR (75 MHz; DMSO-d6; 298K): ppm 144.21; 139.55; 135.57; 126.43; 125.87; 126.36-122.06-117.77-113.47 (q CF$_3$); 116.55; FTIR (ATR cm-1):=1400, 1329, 1281, 1195, 1172, 1159, 1140, 1090, 1058, 844, 776, 735, 655; m/z (ESI-HRMS) 313.9779 ([M$^-$] C9H7F3NO4S2 corresponds to 313.9769).

The monomer 2 has been synthesised in the same manner while replacing 4'-aminobenzo-15-crown-5 with 4'-amino-benzo-18-crown-6.

Synthesis of the Monomers 4 and 5

The monomers 4 and 5 have been synthesised in one single step consisting of an etherification at low temperature in the presence of sodium hydride.

A solution of 2-hydroxymethyl-15-crown-5 (1.55 g; 5.9 mmol) in 15 mL of DMF has been added dropwise to a sodium hydride solution (0.307 g; 7.67 mmol) in DMF under an inert atmosphere at 0° C. After thirty minutes at this temperature, 4-vinylbenzyl chloride (1.109 mL; 7.08 mmol) has been added. The reactive mixture has been left under stirring at 0° C. for 2 hours before letting it return to room temperature. The reaction has been stopped by water addition (70 mL). The organic phase has been extracted several times with ethyl acetate, and the different combined organic phases have been dried with sodium sulfate and concentrated under vacuum. The final product 4 (a colourless oil, 2.4 g; Rdt=93%) has been purified by liquid chromatography with silica gel as a stationary phase and a dichloromethane/diethyl ether mixture (10:1) as a mobile phase.

$^1$H-NMR (CDCl$_3$, 400 MHZ): δ (ppm): 7.30 (dd, 2H); 7.21 (dd, 2H); 6.63 (q, 1H); 5.68 & 5.54 (d, 2H); 4.46 (s, 2H); 3.59 (m, 4H); 3.59 (m, 19H). $^{13}$C-NMR (CDCl$_3$, 150 MHZ): δ(ppm): 136.9; 135.8; 126.7; 125.1; 112.7; 77.7; 69.5; 69.4.

The monomer 5 has been synthesised in the same manner while replacing 2-hydroxymethyl-15-crown-5 with 2-hydroxymethyl-18-crown-6.

Synthesis of the Monomers 6 and 7

The synthesis of the monomers 6 and 7 has been performed in one single step by nucleophilic substitution between chloromethyl-EDOT and 4'-aminobenzo-15-crown-5 or 4'-aminobenzo-18-crown-6 in the presence of potassium carbonate.

In a 100 mL three-necked flask, under an inert atmosphere, chloro-methyl-EDOT (0.3436 g; 1.71 mmol; 1 eq.), 4'-aminobenzo-15-crown-5 (0.5 g; 1.71 mmol; 1 eq.) and sodium carbonate (0.561 g; 5.29 mmol; 3 eq.) have been successively added. The whole has been dissolved in dry acetonitrile (40 mL) using a magnetic stirrer and heated under reflux (70° C.) for 48 h under an inert atmosphere. After return to room temperature, the solvent has been evaporated under vacuum and the obtained raw product has been dissolved in 30 mL of dichloromethane. Its purification has been carried out by liquid-liquid extraction with water (3×10 mL). Afterwards, the organic phase has been dried with magnesium sulfate. After filtration and evaporation of the solvent and drying under vacuum at 45° C. for 24 hours, the pure monomer 6 has been obtained in the form of a brown viscous oil (0.703 g, Rdt=90%).

$^1$H-RMN (400 MHZ; CDCl$_3$; 298K): ppm 6.71 (d, 1H); 6.35 (m, 2H); 6.27 (d, 1H); 6.20 (dd, 1H); 4.48 (s, 16H); 4.35 (m, 1H); 4.28-4.12 (m, 2H); 4.05 (m, 4H); 3.87 (m, 4H); 3.74 (s, 8H); 3.71-3.63 (m, 2H). $^{13}$C-NMR (75 MHz;

CDCl3; 298K): δ/ppm: 150.7; 142.10; 141.34; 141.24; 140.79; 117.49; 107.49; 102.79; 100.24; 72.95; 70.92-68.73; 65.68; 41.45.

The monomer 7 has been obtained in a similar manner while replacing 4'-aminobenzo-15-crown-5 with 4'-aminobenzo-18-crown-6.

Synthesis of the Monomer 8

2'-aminomethyl-3,4-ethylenedioxythiophene (0.350 g; 2.04 mmol, 1 eq.) and 2-(chloromethyl)pyridine hydrochloride (0.714 g; 4.09 mmol, 2 eq.) have been added in a reactor containing 1 ml of water. The latter has been heated up to 60° C. in an oil bath. 2.5 ml of a 5N sodium hydroxide solution has been added to the reactor and the reactive mixture has been left under stirring for one hour. After one hour, 2-(chloromethyl)pyridine hydrochloride (0.335 g; 2.04 mmol, 1 eq.) solubilised in 5 ml of water has been added and left under stirring for 2 hours. After return to room temperature, the mixture has been extracted with diethyl-ether (3×20 mL). After drying the organic phases combined with magnesium sulfate and evaporation of the solvent, a pink oil has been obtained. After purification by liquid chromatography on alumina as a stationary phase and the dichloromethane/methanol solvent mixture (89:1) as a movable phase, the pure product 8 has been obtained in the form of a yellow oil (0.126 g, Rdt=42%).

$^1$H-RMN (400 MHZ; CDCl$_3$; 298K): ppm 8.44 (m, 2H); 7.55 (m, 2H); 7.38 (m, 2H); 7.06 (m, 2H); 6.19 (m, 2H); 4.20 (m, 1H); 4.10-3.90 (m, 2H); 3.85 (m, 4H); 2.81 (m, 2H).
$^{13}$C-NMR (75 or 150 MHz; CDCl$_3$; 298K): δ/ppm: 159.0; 149.1; 141.6; 136.4; 123.1; 122.2; 73.3; 72.3; 67.1; 67.0; 61.1; 55.1; 53.9; 49.2.

Synthesis of the Monomers 9 and 10

A 100 mL three-necked flask, flamed and dried beforehand, has been loaded with chloromethyl-EDOT (0.5 g; 2.62 mmol; 1.0 eq.), hydroxy-methyl-18-crown-6 (0.526 g; 2.62 mmol; 1.0 eq.), potassium carbonate (0.725 g; 5.25 mmol; 2.0 eq.) and a catalytic amount of potassium iodide (0.043 g; 0.26 mmol; 0.1 eq.). The reactive medium has been solubilised in DMF (40 mL). This solution has been vigorously stirred at 100° C. for 24 hours under inert conditions. Then, a chloromethyl-EDOT equivalent has been added and the reaction has been carried on for 24 hours under the same conditions. The reactive mixture has been cooled down until returning to room temperature, and then it has been extracted with dichloromethane (3×20 mL). The combined organic fractions have been washed with water (20 mL) and dried with magnesium sulfate. The solvent has been evaporated under vacuum using a rotary evaporator and the product has been purified by alumina column chromatography as a stationary phase and with a dichloromethane/ethyl acetate/methanol solvent mixture (1:1:1). A caramel-coloured oil 10 (0.84 g; Rdt=72%) has been obtained in this manner.

$^1$H-NMR (CDCl$_3$, 400 MHZ): δ(ppm): 6.33 (s, 2H); 4.23 (t, 2H); 4.11 (dd, 1H); 3.85 (m, 4H); 3.67 (m, 15H).
$^{13}$C-NMR (CDCl$_3$, 150 MHZ): δ(ppm): 141.64; 141.34; 140.89; 100.34; 92.83; 77.23; 74.22; 73.06; 70.8; 65.96; 65.78; 65.49; 61.74; 41.54.

The monomer 9 has been synthesised in a similar manner while replacing hydroxy-methyl-18-crown-6 with hydroxy-methyl-15-crown-5.

Example 2: Synthesis of Polymers According to the Invention

Example 2.1: Copolymerisation of a Monomer According to the Invention and of STFSI The monomers 1 to 3 have been used for the synthesis of new electrolyte polymers by radical polymerisation (via RAFT) known in the literature. Different series of copolymers have been synthesised while systematically changing the ratio between the monomers according to the invention and the more classical styrene (trifluoromethanesulfonyl) imide (STFSI) monomer conferring solubility in water. The experimental procedure for the synthesis of the different electrolyte polymers is described hereinafter.

The necessary amounts of the STFSI monomer and of the monomer according to the invention have been added to the schlenk-type reactor as well as the appropriate amount of the chain transfer agent (CTA) and of the azobisisobutyronitrile radical initiator (AIBN) and solubilized under stirring in DMF to obtain a quite concentrated reactive mixture. After several freeze-thaw cycles, the polymerisation has been performed at 65° C. under an inert atmosphere for a duration ranging from a few days to a few weeks depending on the desired molecular mass. The polymer has been obtained after precipitation in tetrahydrofuran (THF) or THF/diethyl ether mixtures, and then filtering, washing with THF and drying under vacuum at 65° C. for at least one day.

The different ratios used for the monomers 1 (denoted SP15Cr5SI) and 2 (denoted SP18Cr6SI) are listed in Table 1 hereinbelow.

TABLE 1

| weight % STFSI (m1)/ weight % SP15Cr5SI (m2) | $n_{m1}/n_{m2}$ | Mw/KDa | D | weight % STFSI (m1)/ weight % SP18Cr6SI (m2) | $n_{m1}/n_{m2}$ | Mw/KDa | D |
|---|---|---|---|---|---|---|---|
| 60/40 | 1.4 | 154 | 2.8 | 50/50 | 1.4 | 96 | 2.3 |
| 70/30 | 3 | 128 | 2.2 | 60/40 | 2.1 | 44 | 1.4 |
| 80/20 | 5 | 115 | 2.2 | 70/30 | 3.3 | 144 | 2.3 |
| 85/15 | 7.2 | 130 | 2.4 | 85/15 | 7.9 | 135 | 2.6 |
| 95/5 | 24.1 | 108 | 1.8 | 90/10 | 12.5 | 127 | 2.3 |

In Table 1, D refers to the dispersity of the polymer chains and has been determined by size-exclusion chromatography (DMF, polystyrene standards). Mw refers to the molar mass and has been determined by size-exclusion chromatography.

The copolymers involving the monomer 3 and the STFSI monomer have been synthesised with weight proportions of the monomer 3 of 5%, 10%, 30%, 40% and 50%.

Ion specificity has been demonstrated for a copolymer comprising 85% of the STFSI monomer and 15% of the monomer 2 by weight. This copolymer has been characterised by UV-visible spectroscopy in the presence of increasing concentrations of different alkali metal salts (NaCl and KCl). Thus, it has been demonstrated that the polymer comprising the 18-crown-6 group has a greater sensitivity to the cation K$^+$, thereby preserving the specificity observed in the 18-crown-6 monomer.

Example 2.2: Electrochemical Synthesis of Polymers and Electrochemical Characterisation of Monomers and Polymers The electrochemical experiments have been carried out using an AUTOLAB potentiostat monitored by a computer using the 'General Purpose Electrochemical Software' (GPES) software. An electrochemical cell, with a 3-electrode configuration, equipped with a counter-electrode with a large Platinum surface (mesh) and with an Ag/AgCl electrode (in a 3M solution of KCl) as a reference electrode (Bioanalytical Systems) has been used for all experiments.

Glassy carbon has been used as a working electrode for the characterisation of the monomers. Working electrodes composed by films made of gold (120 nm of thickness deposited by heat evaporation over gold substrates) or ITO have been used for the electropolymerisations and the characterisation of the polymer films formed in organic and aqueous media. Acetonitrile has been degassed into the cell before use and kept under an inert atmosphere throughout the electropolymerisation. Before any experiment, the glassy carbon electrode has been polished with alumina (thickness) to guarantee repeatability. The potentiometry experiments have been carried out with a PalmSense potentiostat (Netherlands) monitored by the PS Trace 5.2 software in a two-electrode cell.

The electrochemical profiles of the different monomers, as well as the conditions of polymerisation and copolymerisation with the EDOT monomer have been set out for the obtainment of ion-sensitive polymer films. The experimental procedure is described hereinafter.

An electrochemical cell with a 3-electrode configuration as mentioned before has been used. A 0.1 M solution of lithium perchlorate in acetonitrile has been used as an electrolyte in which the monomer (5 mM) to be characterised or to be polymerised has been added. In the case of copolymerisations, the two monomers have been added in the required concentrations to conduct the study of the molar ratios, namely to have a total concentration of 10 mM. The characterisation of the electrochemical profile of the commercial monomer EDOT and of the monomer 6 according to the invention has been done using the glassy carbon electrode, polished beforehand to guarantee the use of a homogeneous and repeatable surface from one experiment to another. To characterise the oxidation potential of each monomer, one single potentiodynamic voltammetry cycle has been performed. The experiment has been done using 0 V as initial and final potentials as well as 1.5 V as a maximum potential of the cycle. Scanning has been done at a rate of 25 mV/min. For the electro (co)polymerisations, a gold electrode has been used (a 120 nm thick film deposited by metal evaporation over glass-made substrates).

Scanning has been done between 0 and 1.4 V for oxidation and between 1.4 V and −0.6 V for reduction at the same rate of 25 mV/min for 10 cycles. The polymer films obtained by electropolymerisation have firstly been characterised in the same type of electrolyte (0.1M of lithium perchlorate in acetonitrile). A second series of characterisations has been carried out in an aqueous medium with saline solutions with different concentrations (10 mM-100 mM of NaCl, KCl or $ZnCl_2$) for the analysis of ion sensitivity.

The following polymers have been synthesised: a polymer obtained by electropolymerisation of the monomer 6, a copolymer of the monomer 6 with EDOT, in molar ratios (EDOT/6) of 1/1, 2/1, 3/1 and 2/3.

Figure 5:
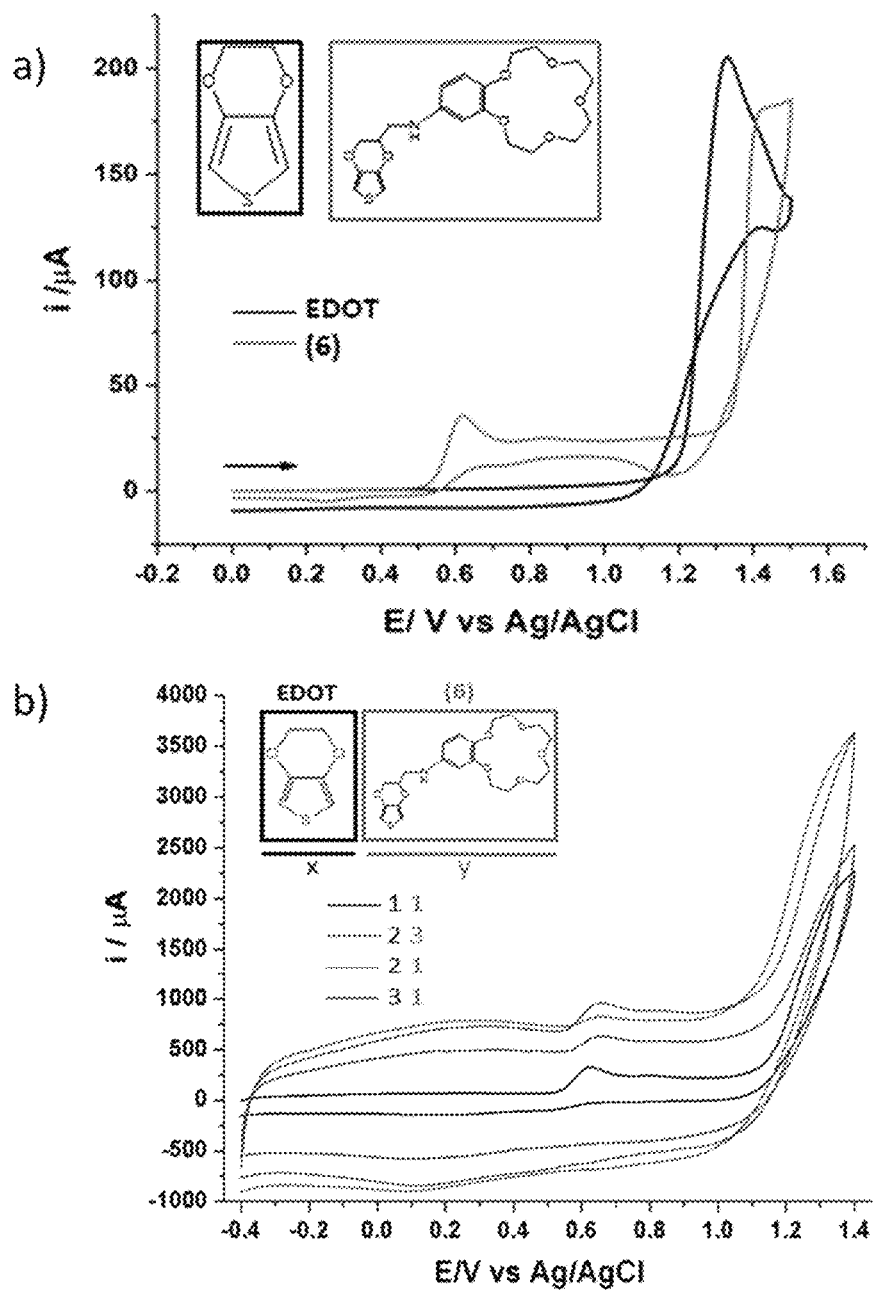
FIG. 5 presents (a) the electrochemical characterisation of the monomer 6 with respect to that one of the EDOT monomer, (b) the electrochemical characterisation of the different copolymers of the monomer 6 with EDOT, in the order of the curves (starting from the top at the level of the 0.0 abscissa) with EDOT/monomer 6 ratios of 2/1, 3/1, 2/3 and 1/1.
Figure 6:
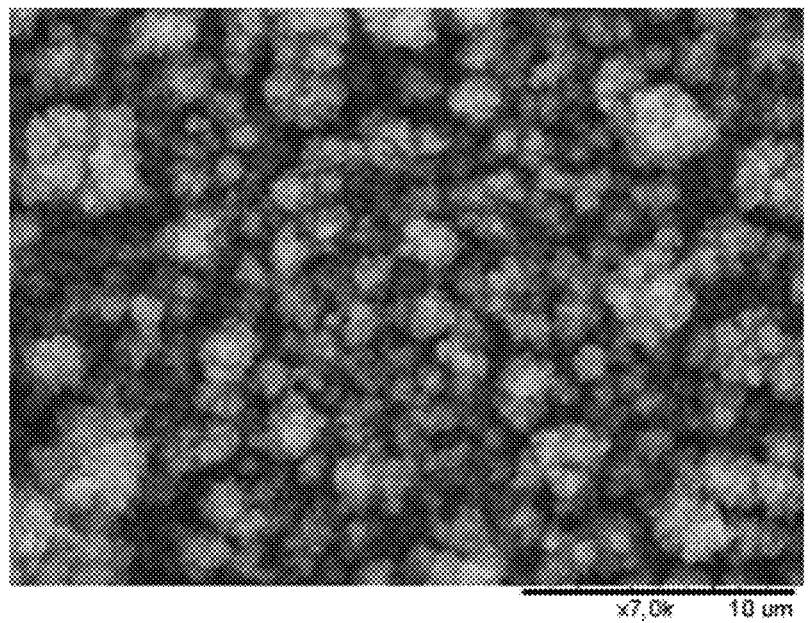
FIG. 6 presents (a) a scanning electron microscopy image of the EDOT/monomer 6 copolymer with a 3/1 ratio, (b) a scanning electron microscopy image of a 20-micron film formed by electropolymerisation of the monomer 6.
Figure 6:
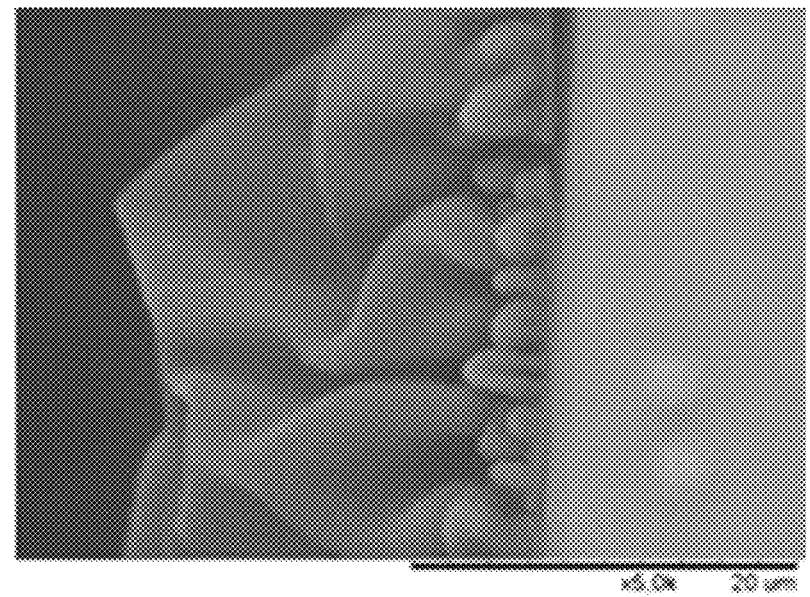

FIG. 5a shows the electrochemical characterisation of the monomer 6 in comparison with that one of the EDOT monomer. FIG. 5b shows the electrochemical characterisation of the different copolymers of the monomer 6 with EDOT, in the order of the curves (starting from the top at the level of the 0.0 abscissa) with EDOT/monomer 6 ratios of 2/1, 3/1, 2/3 and 1/1. FIG. 6a shows a scanning electron microscopy image of the EDOT/monomer 6 copolymer with a 3/1 ratio. FIG. 6b shows a scanning electron microscopy image of a 20-micron film formed by electropolymerisation of the monomer 6.

Example 3: Preparation of Inks According to the Invention

The electrolyte polymers obtained in the Example 2.1 have been used as stabilisers in aqueous dispersions of the EDOT monomer to produce PEDOT-based ion-sensitive inks by oxidative polymerisation.

Three aqueous solutions of iron chloride (III) (0.036 mg; 5.84 mmol), of ammonium persulfate (0.161 mg; 36.7 mmol) and of the copolymer obtained at Example 2.1 from the ion-sensitive styrene derivatives 1 to 3 with STFSI (0.210 g-0.420 g) have been prepared and left under stirring for 5 h before use. Once this time has elapsed, the solution of the electrolyte polymer has been transferred into a reactor and the EDOT monomer has been added (36 µL, 0.34 mmol) and then left under stirring for half an hour and under a nitrogen flux at 10° C. The addition of half the volumes of the solutions of oxidants (iron chloride and ammonium persulfate) prepared beforehand allows starting the oxidative polymerisation of the EDOT. The reaction has been left for 64 h under an inert atmosphere. The purification has been carried out by ultrafiltration. A first washing has been done with a 1M solution of hydrochloric acid (150 mL). After concentration of the ink, it has been subjected to a second dilution with the same acid solution. After stirring for 2 hours, a third and last washing with water MilliQ has been carried out. Afterwards, the ink has been filtered and analysed by UV-Visible spectroscopy to determine a solution containing 1% of dry matter according to our calibration. For storage thereof, the inks are kept in darkness and maintained under magnetic stirring at constant room temperature.

Figure 2:
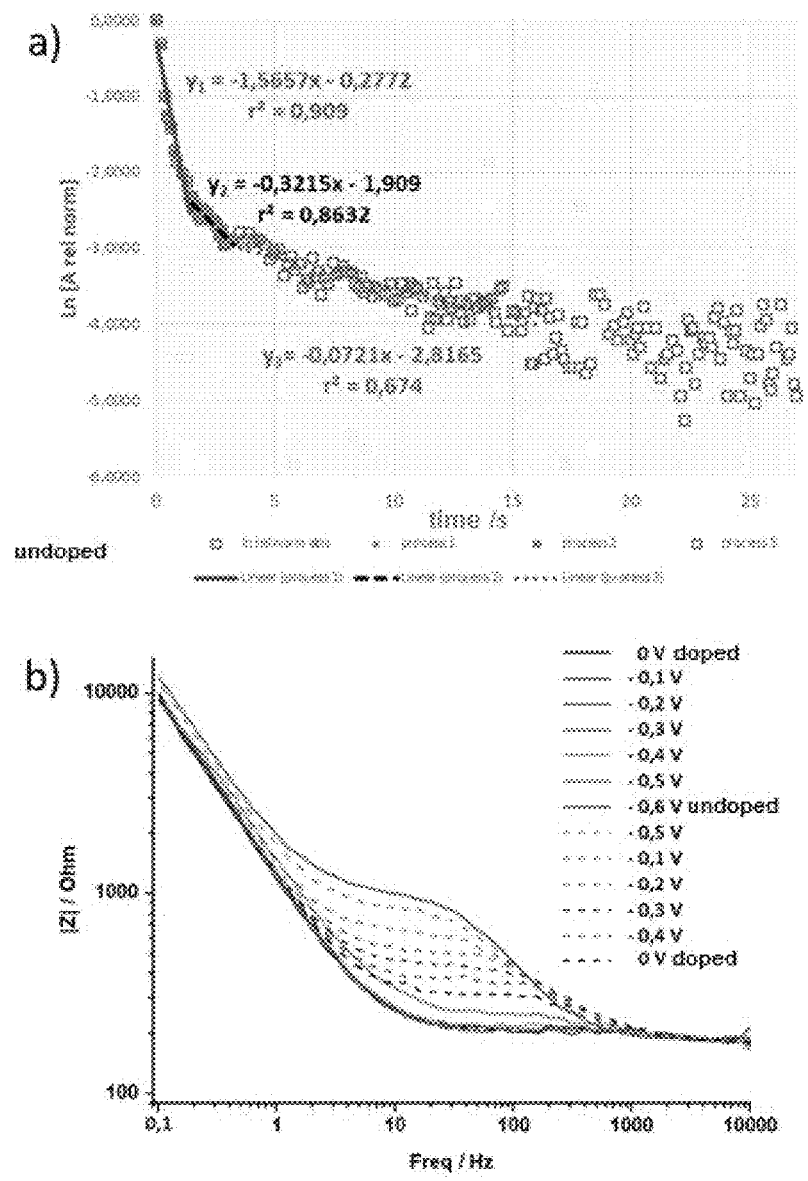
FIG. 2 presents the electrochemical characteristics of the undoping time of the PEDOT ink: PSTFSI-85:PSP15Cr5SI-15 (a) and the characterisation by electro-impedance spectroscopy (EIS) of the PEDOT ink:PSTFSI-85:PSP15Cr5SI-15 (b).

FIG. 1 presents the synthesised inks and their comparison with the reference system PEDOT:PSS. FIG. 2 presents the electrochemical characterisation of the undoping time of an ink according to the invention and the characterisation by electro-impedance spectroscopy of the same ink. The ink is a PEDOT:PSTFSI 85:PSP15Cr5SI 15 ink, SP15Cr5SI referring to the monomer 1. The polymers and conductive complexes according to the invention can form stable aqueous dispersions. Their electrochemical properties are preserved. Their undoping rate is comparable to that one observed with the conventional complex PEDOT:PSS.

The characterisation of the polymers, conductive complexes and inks according to the invention may be carried out by conventional methods such as electrochemical impedance spectroscopy (EIS) or electrochemical spectroscopy (ECS). Some properties of the polymers, complexes and inks according to the invention exceed even those of the PEDOT:PSS complex, for example their capacitance, which is a useful property in OECT-type devices.

Example 4: Study of the Cytotoxicity of the Inks

Example 4.1: Preliminary Study of Cytotoxicity

Figure 3:
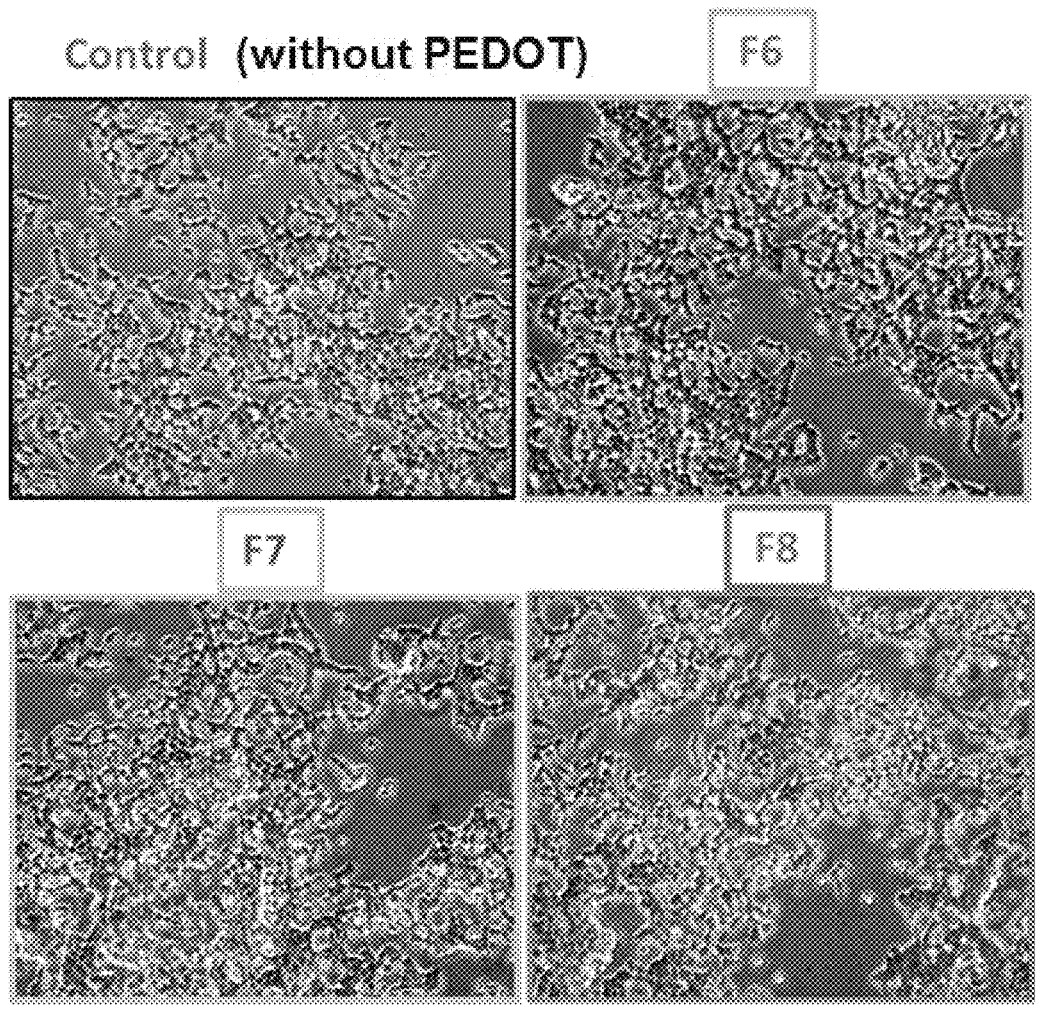
FIG. 3 presents the morphology of β-clonal cells (line INS-832/13) cultivated on lamellas with/without the thin layer of PEDOT-based inks stabilised by electrolyte polymers containing the ion-sensitive fractions F6, F7 and F8 described in Table 2.

The cytotoxicity of these inks has been preliminarily assessed (FIG. 3) through the observation of the morphology of the cells of a clonal line of beta cells in the presence of a thin layer of a film of 3 inks according to the invention. The composition of the 3 inks is detailed in Table 2 hereinbelow:

TABLE 2

| | Formulation Stirring = 2 weeks Reactant | | |
|---|---|---|---|
| | F6 | F7 | F8 |
| V/µL of PEDOT: Polyélectrolyte | 1000 µL of PEDOT: PSS_95-PS18Cr6-1_5 | 1000 µL of PEDOT: PSTFI 85-PS18Cr6-1_15 | 1000 µL of PEDOT: PSTFI_85-PS18Cr6-1_15 |
| DMSO | 50 µL | 50 µL | 50 µL |
| GOPS | 20 µL | 10 µL | 20 µL |
| Zonyl 4% | 10 µL | 10 µL | 10 µL |

The films consist of 150 nm films deposited by spin coating. After two days of cellular culture, no significant cytotoxicity has been observed and the cellular growth has been similar to that one under the control conditions.

Figure 4:
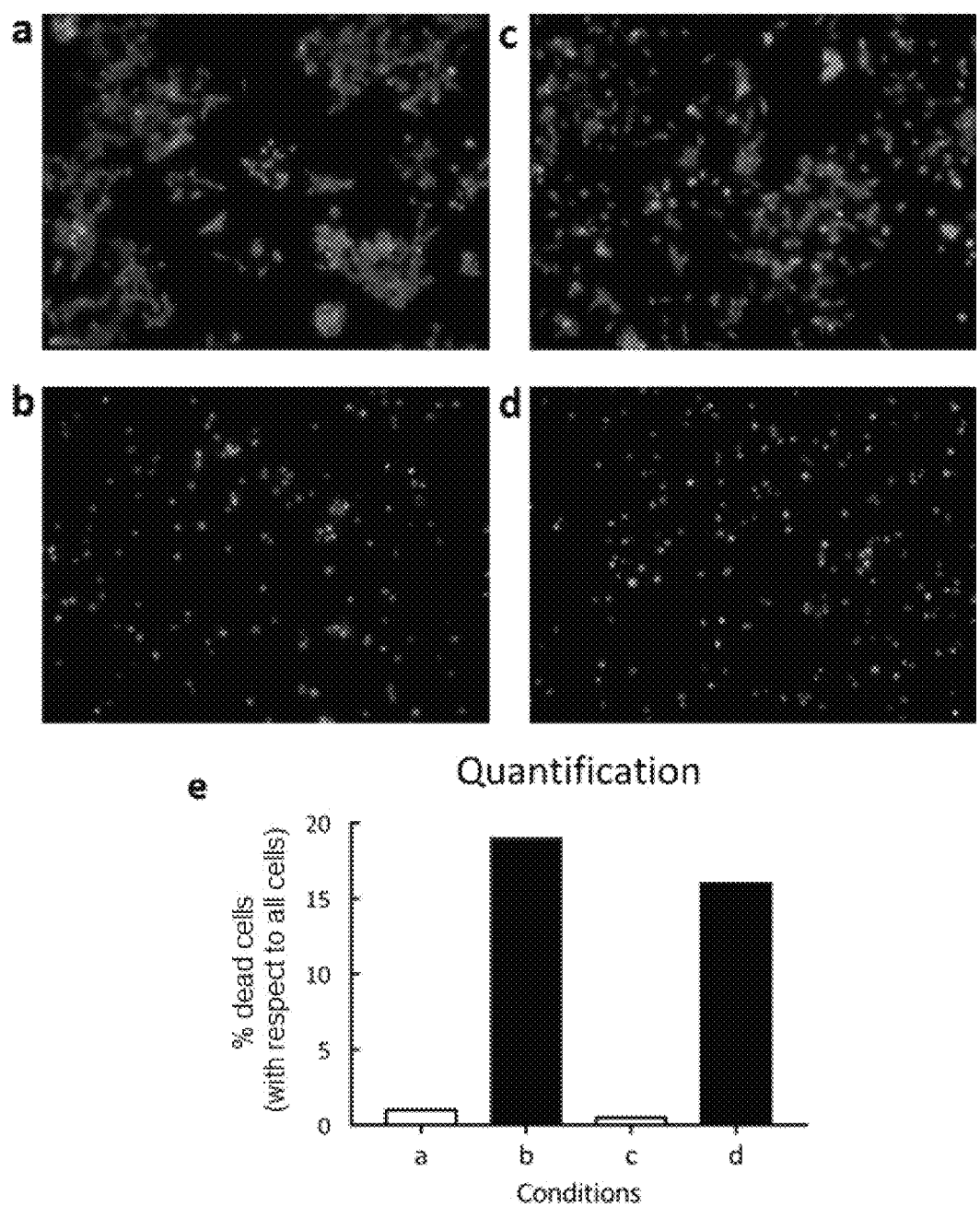
FIG. 4 presents the effect of thapsigargin on β-clonal cells (line INS-832/13) cultivated on lamellas with/without the thin layer of ink of the PEDOT complex: polymer according to the invention, the polymer according to the invention being a copolymer between STFSI and the monomer 2, in 85/15 weight proportions (PEDOT:PSTFSI 85-co-PS18-crown-6). (a) and (b) are images on lamellas without the thin layer of ink according to the invention, (c) and (d) are images with a thin layer of ink according to the invention. (a) and (c) are images in the absence of thapsigargin, (b) and (d) are images in the presence of thapsigargin, (e) represents the quantification of the percentage of dead cells for each condition.

Example 4.2: Study of the Cellular Death in the Presence and in the Absence of an Ink According to the Invention β clonal cells (INS832-13) have been cultivated for 24 h on reference lamellas (a and b) or on lamellas covered with an ink of the studied polymer (c and d) (in this case PEDOT:PSTFSI_85/monomer 2_15, based in the same stabiliser characterised in UV). The effect of thapsigargin (a medicine inducing apoptosis) has been assessed on the cells cultivated on a lamella covered with the ink according to the invention (d) and compared with the effect of the same medicine on the cells cultivated on the reference lamella (b). FIG. 4 presents the assessment of the cytotoxicity of the indicated components. The effect of thapsigargin on β-clonal cells (line INS-832/13) serves as a positive control thanks to its known cytotoxic activity. Afterwards, the lamellas have been subjected to a marking with fluorochrome of live cells (in green) and dead cells (in red). Merged images are shown in FIG. 4.

The measurement of apoptosis in response to a stimulus allows assessing the capability of the cells to operate in normal manner and without damage. A low apoptosis rate is always observed throughout the growth of cells in culture medium, and it is comparable in both studied cases (lamellas with and without the ink according to the invention), which means that the growth of the cells is normal and the mortality of the cells is negligible.

Thapsigargin is a non-competitive inhibitor of the calcium ATPase pump of the endoplasmic reticulum SERCA, which increases the intracellular calcium concentration by blocking the capability of the cell to pump calcium into the endoplasmic reticulum, thereby causing the death of the cell.

After addition of thapsigargin, a comparable cellular growth has been observed in both culture conditions (lamellas with/without the ink according to the invention). In both cases, the morphology of the cells is substantially affected by the presence of thapsigargin. We notice the decrease in the number of cells and the apparition of the red colour under the apoptotic condition (b, d) whereas the cells are more numerous and live in the presence of thin layers of ink without thapsigargin.

The (dead cells)/(dead cells+live cells) has been calculated in the presence and in the absence of the ink according to the invention (FIG. 4(*e*)) and it is comparable in both cases, which proves that the inks according to the invention are not cytotoxic under these conditions.

Example 5: Manufacture of Organic Electrochemical Transistors

Finally, various organic electrochemical transistors (OECT) have been manufactured with the inks synthesised in Example 3, in particular PEDOT:PSTFSI_85/monomer 2_15 and PEDOT:PSTFSI_95/monomer 2_5.

A. Transistor Deposited by Evaporation

Figure 7:
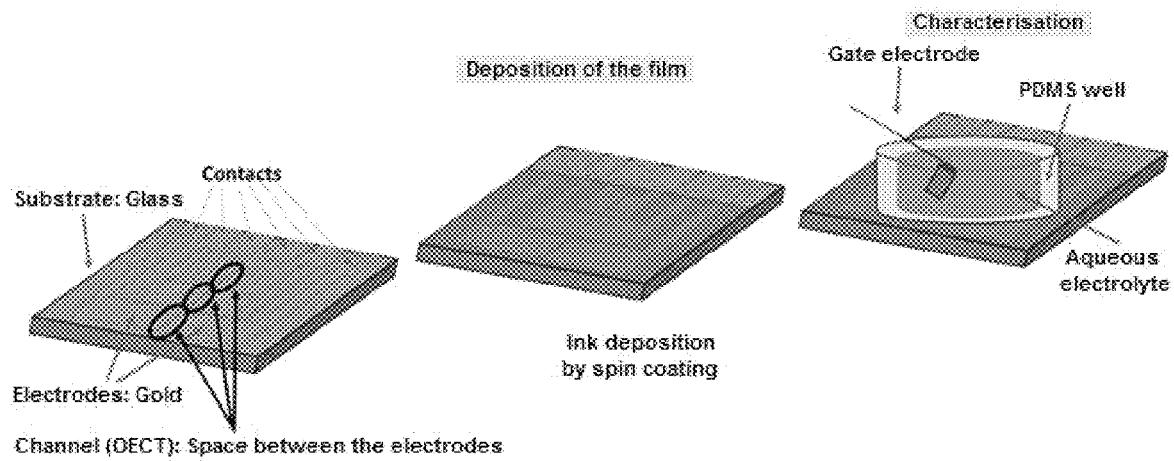
FIG. 7 represents a diagram of the manufacture and characterisation of an OECT according to the invention.
Figure 8:
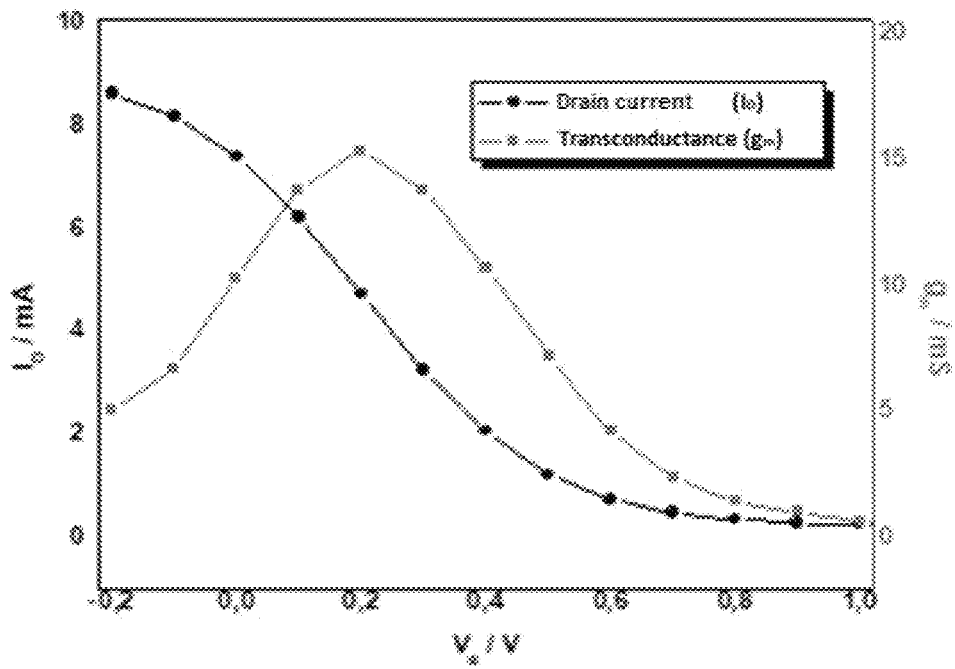
FIG. 8 represents the physical characterisation of an OECT according to the invention. The curve with the points (left-side axis) is the transfer curve showing the "on" condition (at a gate voltage of −0.2V) and the "off" condition (at a gate voltage of +0.75 V) of the electrochemical transistor (VD=−0.4V). The curve with squares (right-side axis) is the transconductance of the electrochemical transistor showing a maximum amplification at low voltage ($V_g$=+ 0.2 V) and with a magnitude similar to those of the prior art (VD=−0.4V).

FIG. 7 shows a diagram of manufacture and characterisation of an OECT according to the invention, FIG. 8 shows the results of characterisation of said transistors. The manufacture has been done by conventional metallic evaporation methods and the use of masks for the definition of the electrodes. The used ink is PEDOT:PSTFSI_85/monomer 2_15. The deposition of the ink has been done by spin coating. The characterisation has been carried out in an aqueous medium.

The physical characterisation of the OECTs, featuring performances in the same range as those described in the prior art, has allowed demonstrating the potential use of the materials according to the invention as mixed conductive materials and as active materials in OECT-type devices. Indeed, the obtainment of a transfer curve ($I_D$ in FIG. 8) with a conductive initial state ("on") with a current of 8.7 mA (max $I_D$, Y-axis to the left) and which passes through a zero current, 0 mA, non-conductive state ("off") when the gate voltage is applied (at $V_g$=0.6-0.8V; X-axis) indicates that the material conducts electrons and ions, while being a "mixed conductor". In addition, the maximum amplification, known as the maximum transconductance ($g_m$), is in the range of the values encountered in the prior art for devices manufactured with PEDOT:PSS.

B. Transistor Deposited by Lithography

Figure 9:
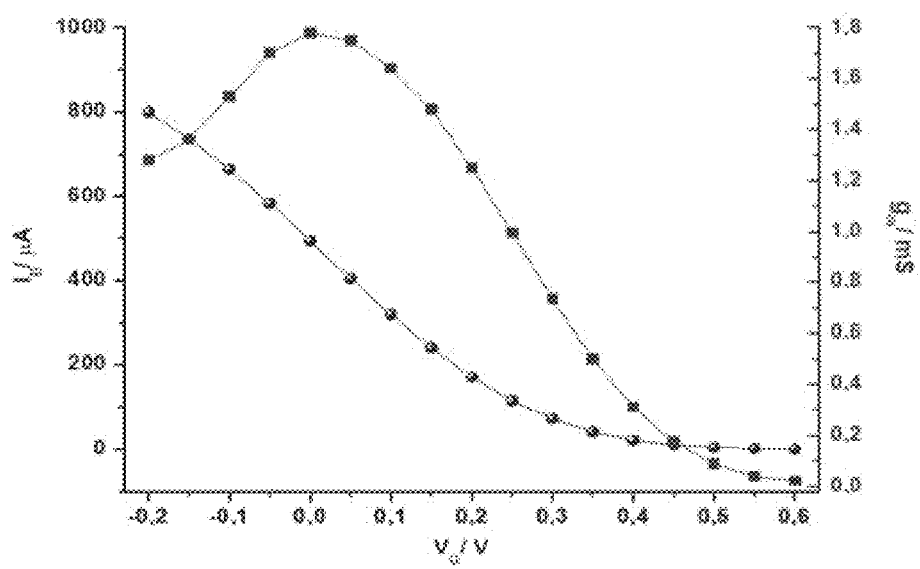
FIG. 9 represents the physical characterisation of an OECT according to the invention. The curve with points (left-side axis) is the transfer curve showing the "on" condition (at a gate voltage of −0.2V) and the "off" condition" (at a gate voltage of +0.65 V) of the electrochemical transistor ($V_{DS}$=−0.4V). The curve with squares (right-side axis) is the transconductance of the electrochemical transistor.

Another OECT transistor has been manufactured by lithography with the PEDOT; PSTFSI_85/monomer 2_15 ink. The transfer curve and the corresponding transconductance curve are shown in FIG. 9. In the same manner as with the transistor deposited by evaporation, this curve demonstrates the mixed conduction of ions and electrons in the ink film that serves as a channel in the transistor. The transfer curve is plotted at a voltage difference of −0.4V between the source and the drain. The dimensions of the transistors are as follows: width 10 micrometers, length 100 micrometers and thickness 100 nanometers.

c. Study of the Selectivity

The OECTs have been characterised in electrolytes in the presence of different target cations and of their competitors. The ion selectivity is determined by calculating the ratio of the slopes of the linear regressions of the transfer curves for a target cation and its competitor. The Table 3 summarises the results obtained for a transistor obtained with a PEDOT:PSTFSI_85/monomer 2_15 ink and a control transistor with PEDOT:PSTFSI.

TABLE 3

| Ink | Cation | Slope | $K^+$/$Na^+$ Ratio |
|---|---|---|---|
| PEDOT: PSTFSI_85/ monomer 2_15 | $K^+$ | −1.09E−07 | 1.9 |
| | $Na^+$ | −5.60E−08 | |
| PEDOT: PSTFSI | $K^+$ | −2.45E−06 | 1.0 |
| | $Na^+$ | −2.57E−06 | |

These results demonstrate that an ion selectivity of the transistors according to the invention, in particular in comparison with a PEDOT:PSTFSI reference transistor for which the ratio is 1.

Of course, various other modifications may be made to the invention in the context of the appended claims.

The invention claimed is:

1. A method for coating an electrode or for manufacturing an organic electrochemical transistor, comprising:
providing at least one polymer comprising at least one unit of formula (I)

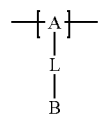

Formula (I)

wherein
A is a polymerisable monomer, said polymerizable monomer being 3,4-ethylenedioxythiophene,
L is a spacer arm, wherein the spacer arm is a group comprising at least one carbon, hydrogen, phosphorus, sulfur, nitrogen and/or oxygen atom, and
B is a chemical group capable of complexing or chelating at least one ion selected from the group consisting of $K^+$, $Na^+$, $Ca^{2+}$ and $Zn^{2+}$, and
depositing, using electropolymerization, the at least one polymer comprising at least one unit of formula (I) on the electrode or on the substrate of the transistor,
wherein either the polymer comprising at least one unit of formula (I) is an electronically conductive polymer, or the polymer comprising at least one unit of formula (I) is electronically non-conductive and is used in the form of a mixture with another electronically conductive polymer.

2. The method of claim 1, wherein the polymer comprising at least one unit of formula (I) is in the form of an ink.

* * * * *